United States Patent [19]

Wu

[11] Patent Number: 5,179,912
[45] Date of Patent: Jan. 19, 1993

[54] WASTE-RECEIVING PLATE FOR CHICKEN CAGES

[76] Inventor: Chuan-Chin Wu, No. 150, Yung-Hsing Lane, Nei Pu Hsiang, Ping Tung Hsien, Taiwan

[21] Appl. No.: 921,243

[22] Filed: Jul. 29, 1992

[51] Int. Cl.⁵ ............................................. A01K 31/00
[52] U.S. Cl. .................................................. 119/22
[58] Field of Search .................. 119/22, 21, 28, 82

[56] References Cited

U.S. PATENT DOCUMENTS

| | | | |
|---|---|---|---|
| 1,719,768 | 7/1929 | Jonnson | 119/22 |
| 2,021,746 | 11/1935 | Purnell | 119/22 |
| 2,856,897 | 10/1958 | Galinsky et al. | 119/22 |
| 4,430,960 | 2/1984 | Nagel et al. | 119/22 |

Primary Examiner—Gene Mancene
Assistant Examiner—Thomas Price
Attorney, Agent, or Firm—Morton J. Rosenberg; David I. Klein

[57] ABSTRACT

A waste-receiving plate for chicken cages comprising a plate member and four feet supporting the plate member high above the ground, the plate member having many net-like holes, four receptacles for fitting with the feet to secure the feet with the plate member, and two large notches at both ends of a side to contact an inclined post of a chicken cage to secure the plate member on the feet, and many crossing ribs extending downward to reinforce the plate member to endure weight of any chicken wastes.

3 Claims, 5 Drawing Sheets

WASTE-RECEIVING PLATE FOR CHICKEN CAGES

BACKGROUND OF THE INVENTION

Coventional chicken cages used by chicken farms are usually arranged in a long staircase style and supported by inclined posts, letting chicken wastes to drop on the concrete ground as shown in FIG. 8. Then wastes are to be cleaned away in a few days. But this way of treating wastes have the following disadvantages.

1. Wastes dropped and piled on the ground are not easy to clean off, liable to invite flies and mosquitoes, giving rise to maggots. Then additional medicinal disinfection is indispensable.

2. Chicken wastes easily produce amino bad odor, which pollutes air and indirectly impairs health of egg producing hens, and consequently quality and quantity of eggs produced will be affected.

3. Cleaning chicken wastes dropped on the ground with water can indirectly pollute the environment and water source. Washed-away chicken wastes could be sold as fertilizer, if dried out.

SUMMARY OF THE INVENTION

This invention has been devised to offer a wastes-receiving plate for chicken cages, which is adapted to be located between bottoms of chicken cages and the ground, receiving chicken wastes thereon so that wastes dropped on the plate can be quickly dehydrated by good ventilation of air flowing on and under the plate.

The wastes-receiving plate for chicken cages in the present invention has been planned to have the following advantages.

1. The wastes-receiving plate is adapted to be located between chicken cages and the ground, directly receiving chicken wastes to prevent them from dropping on the ground.

2. As the plate has many small holes like a net and is supported comparatively high above the ground, it has an extremely good ventilation to shorten time for chicken wastes to dehydrate, and to decrease flies and mosquitoes to gather thereon or maggots to arise as less as possible. The expenditure for medicinal disinfection can be saved.

3. The plate can be easily and conveniently taken off and placed on feet for standing on the ground, so collecting wastes from the plate can be performed in a short time.

4. Quantity of chicken wastes collected from this plate can be more than that collected from the ground.

5. Time needed for cleaning wastes can be shortened, and indirect water source pollution can be avoided.

6. Bad odor of amino coming from chicken wastes can be decreased by periodic changing of the plates, and thus improving the environment of chicken cages can indirectly secure health of chickens to elevate quantity and quality of eggs produced.

7. The plate is reinforced by many crossing ribs for enduring weight of chicken wastes it receives.

The wastes-receiving plate for chicken cages in the present invention comprises a plate member, and four feet combined with the plate member to support the plate member high above the ground.

The plate member has a plurality of small holes like a net and four receptacles properly spaced apart for combining the plate with four feet standing on the ground, and one or two notches in one or both ends of a side to contact an inclined post of a chicken cage to help to secure the plate in place.

The four receptacles respectively have two opposite projections on an inner spherical surface to engage two opposite L-shaped slots in an upper spherical edge of each foot and then the foot is rotated to make the projections move in left halves of the horizontal portions of the L-shaped slots so as to secure the foot with the plate.

BRIEF DESCRIPTION OF DRAWINGS

The invention will be better understood by reference to the accompanying drawings, wherein.

DETAILED DESCRIPTION OF THE INVENTION

Figure 2:
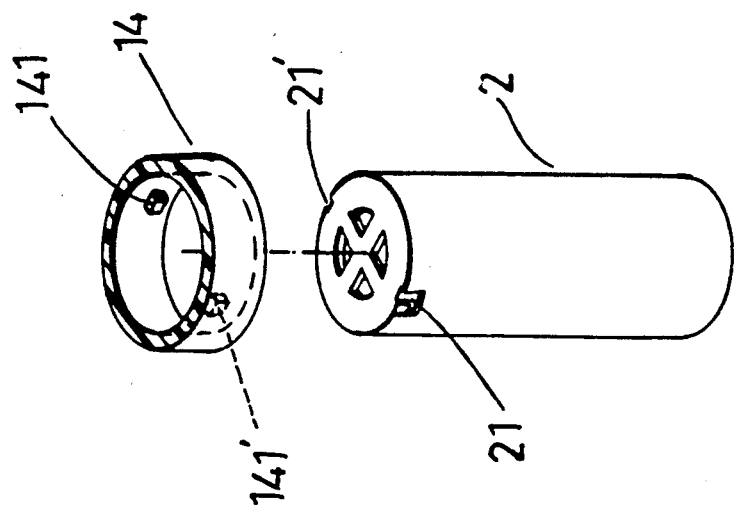
FIG. 2 is a magnified view of a foot and receptacle in the first embodiment of the wastes-receiving plate for chicken cages in the present invention.
Figure 1:
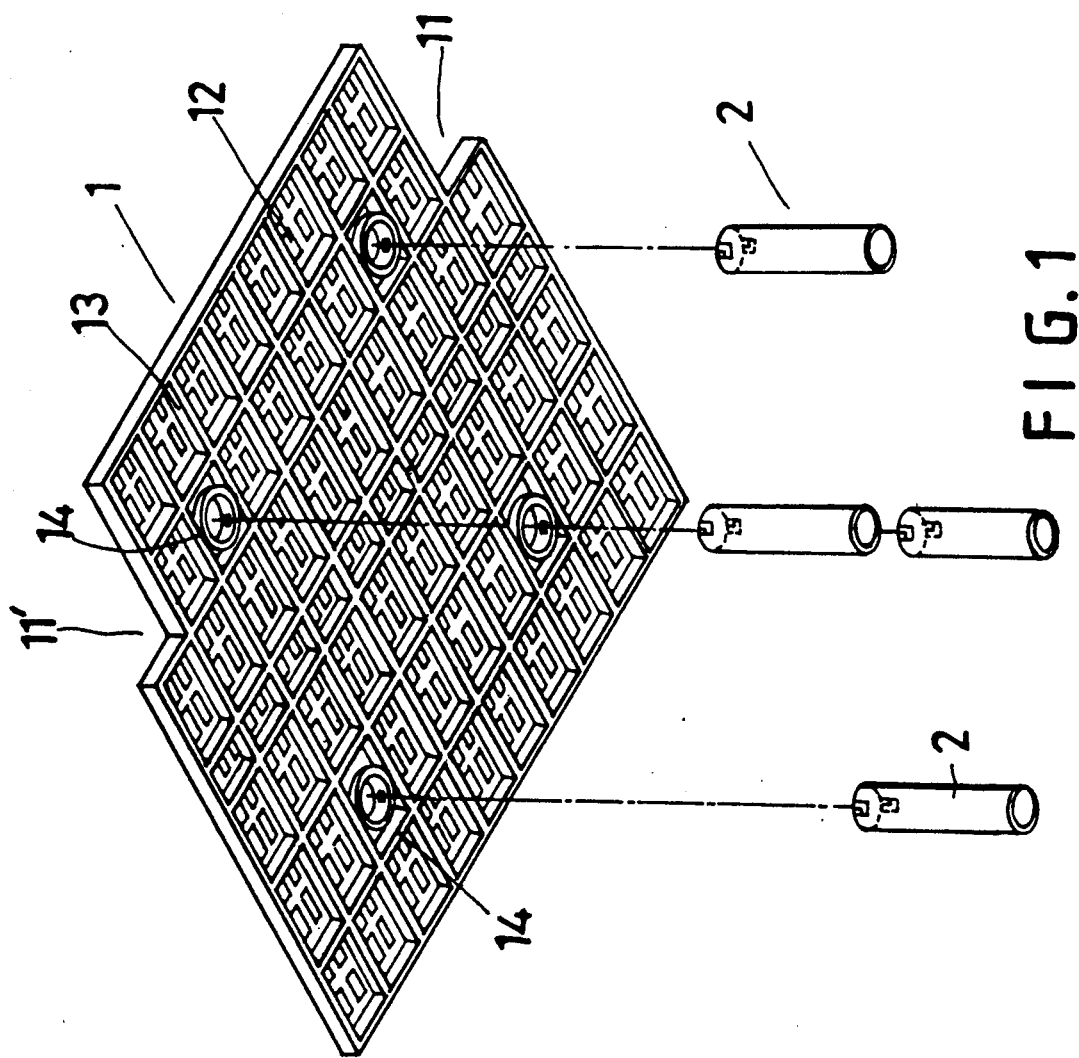
FIG. 1 is an exploded perspective view of a first embodiment of a wastes-receiving plate for chicken cages in the present invention.

A wastes-receiving plate for chicken cages in the present invention, as shown in FIG. 1, comprises a plate member 1 and four feet 2 combined upright with and supporting the plate member 1 high above the ground.

The plate member 1 has two large notches 11, 11' at both ends of a side, a plurality of holes 12 formed as net holes, a plurality of straight parallel ribs 13 extending downward in lengthwise and lateral direction and four round receptacles 14 spaced apart to fit with an upper end of four feet 2 and having two opposite projections 141, 141' on an inner peripheral surface.

The four feet 2 stands on the ground at a lower end and fit with the receptacles 14 at the other end, an upper end, to support the plate member 1 separated from the ground for a distance. Each foot 2 has two opposite L-shaped slots in an upper spherical edge for correspondingly fitting with the projections 141, 141' in each receptacle 14 so as to keep the foot 2 in position securely.

Figure 3:
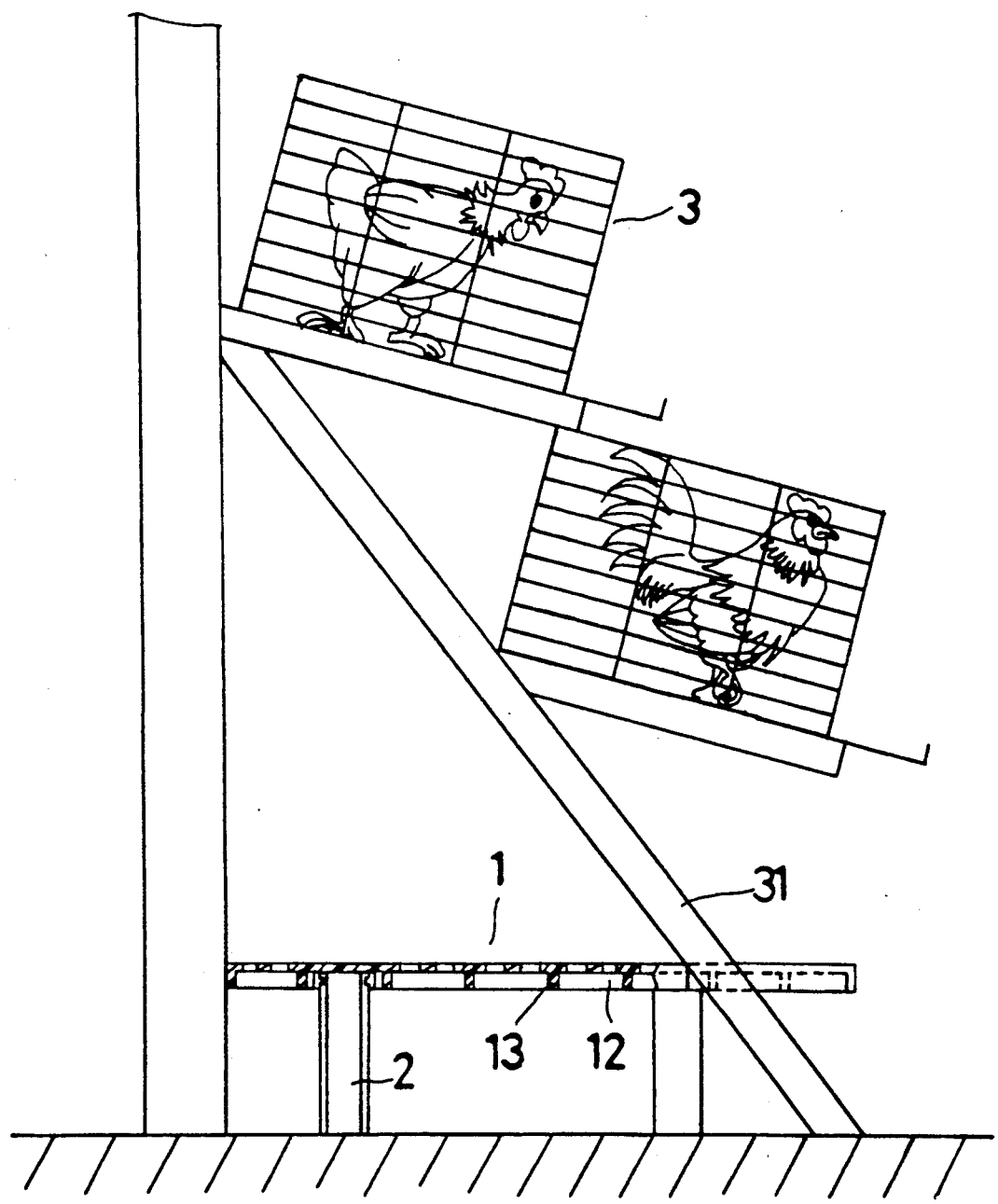
FIG. 3 is side cross-sectional view of the first embodiment of the wastes-receiving plate for chicken cages in the present invention.
Figure 4:
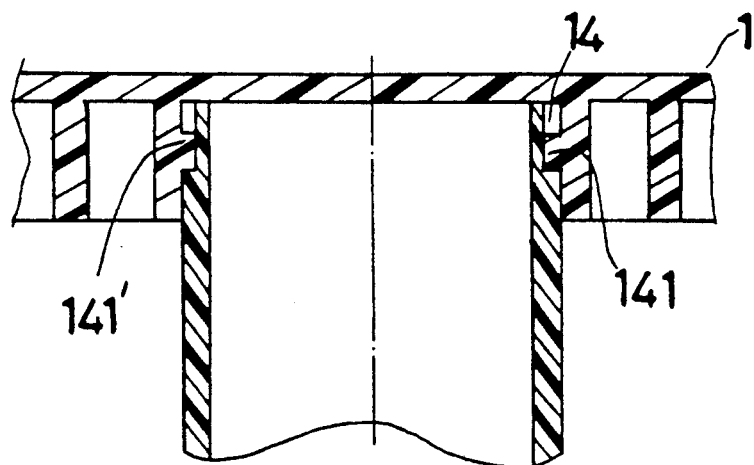
FIG. 4 is a cross-sectional view of the foot combined with the receptacle in the first embodiment of the waste-receiving plate for chicken cages in the present invention.
Figure 5:
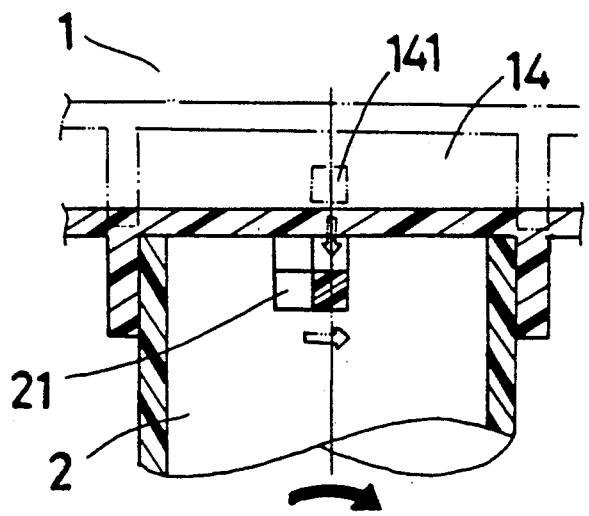
FIG. 5 is a cross-sectional view of a receptacle combined with a removable foot in the first embodiment of the wastes-receiving plate for chicken cages in the present invention.
Figure 6:
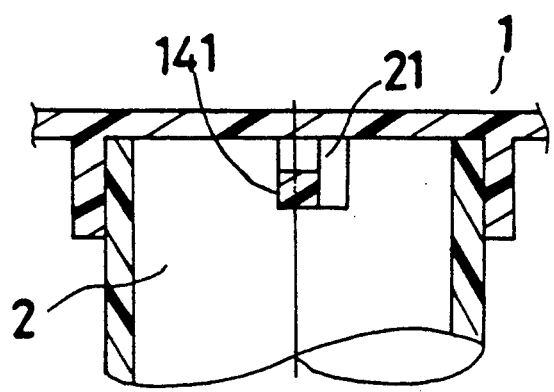
FIG. 6 is cross-sectional view of a receptacle which has been combined immovable with a foot in the first embodiment of the wastes-receiving plate for chicken cages in the present invention.
Figure 7:
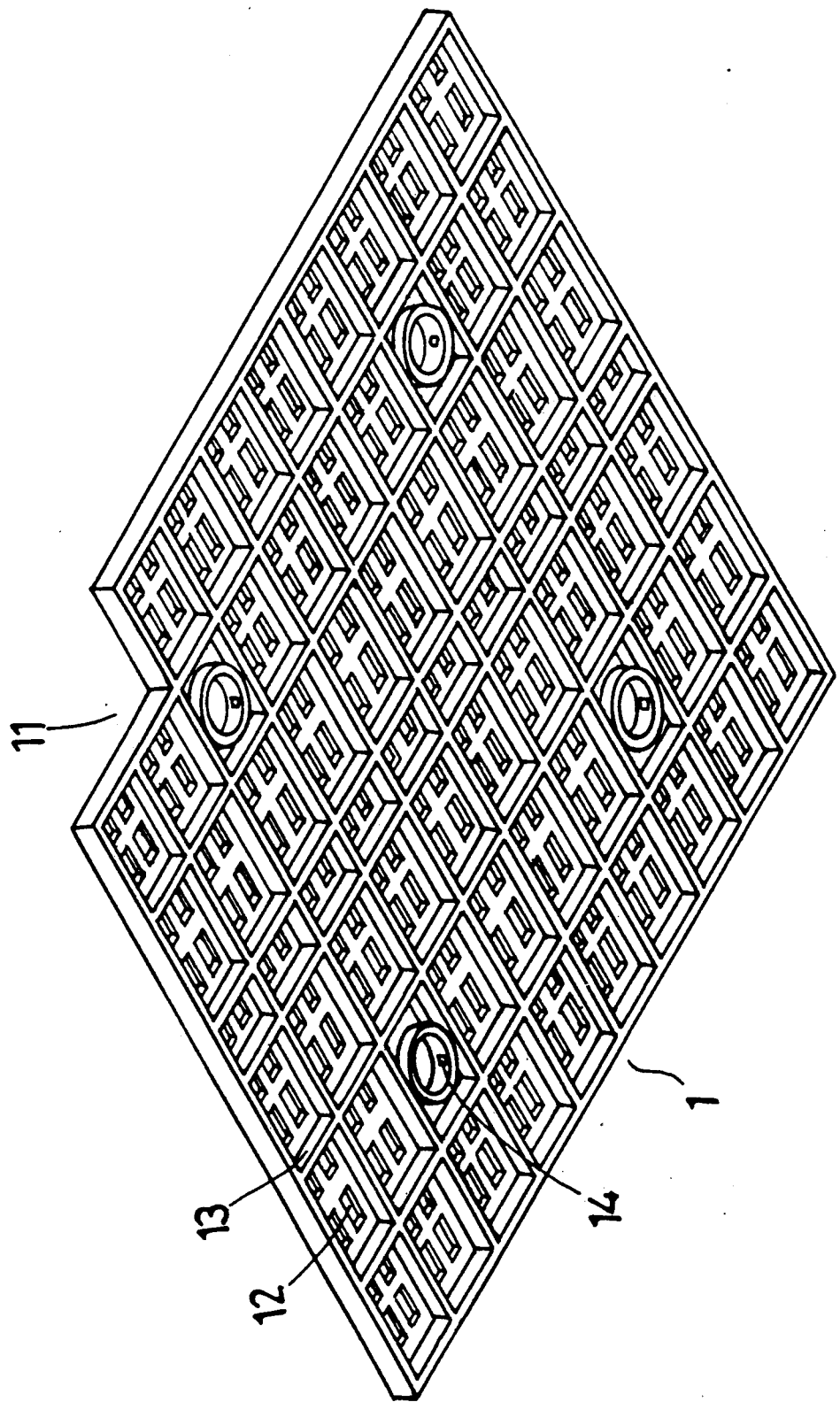
FIG. 7 is a perspective view of a second embodiment of the wastes-receiving plate for chicken cages in the present invention; and, FIG. 8 is a photo of conventional chicken cages.
Figure 8:
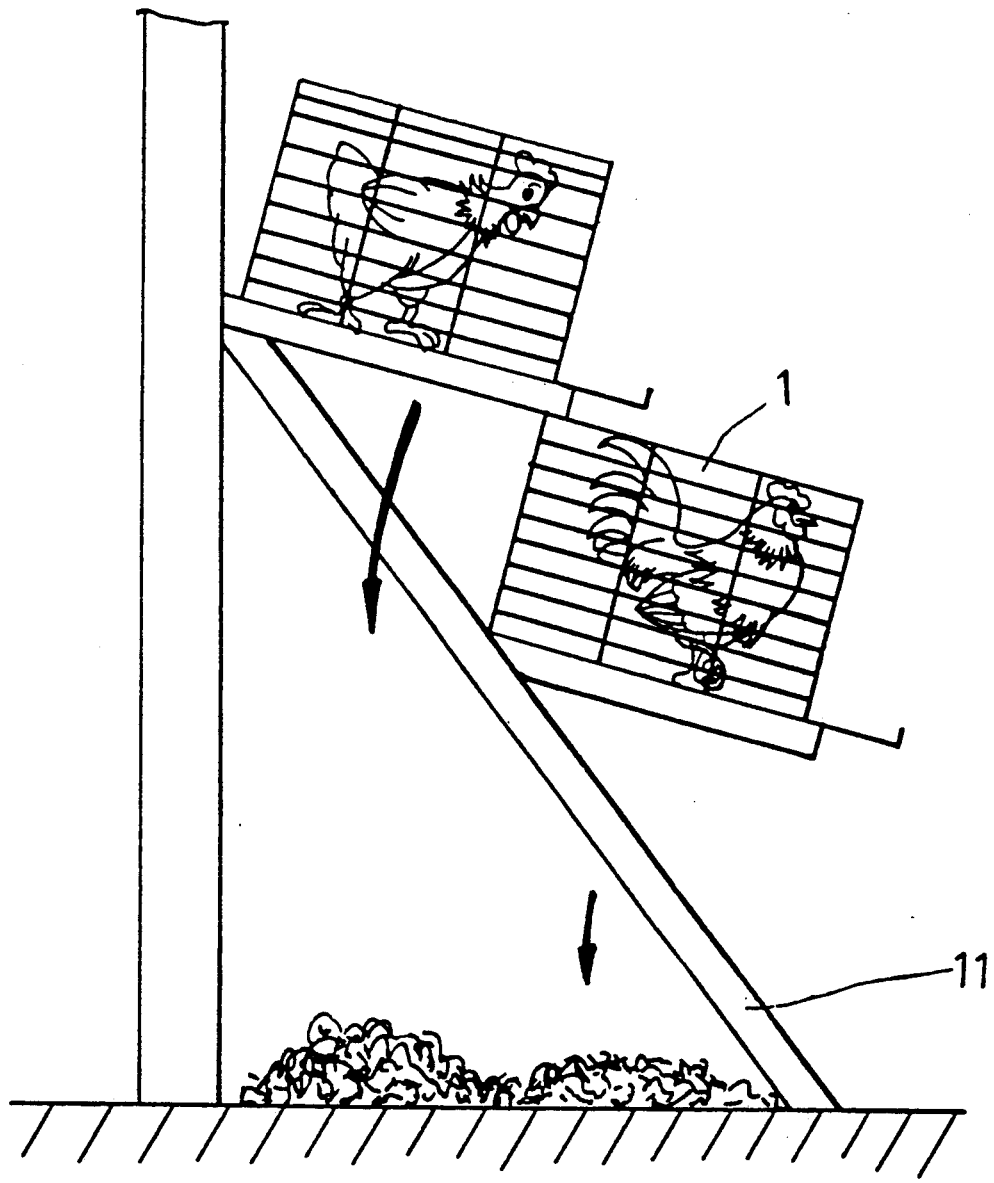

In assembling this plate, the L-shaped slots 21, 21' in the feet 2 are first vertically fitted with the projections 141, 141' in the receptacles 14 as shown in FIG. 4 and then the feet 2 are rotated as shown in FIG. 5, letting the projections 141, 141' move in left halves of the horizontal portions of the L-shaped slots 21, 21' as shown in FIG. 6 so that the feet 2 are kept secured in position. And the plate member 1 is suported by the feet 2 high above the ground, having one or both of the two large notches 11, 11' contacting a proper part of an inclined post of chicken cages as shown in FIG. 3, and being located horizontally between chicken cages arranged in a staircase style and the ground so as to receive wastes of chickens kept in the cages.

While the preferred embodiments of the invention have been described above, it will be recognized and understood that various modifications may be made therein and the appended claims are intended to cover all such modifications which may fall within the spirit and scope of the invention.

What is claimed is:

1. A waste-receiving plate in combination with chicken cages comprising:

a plate member having a plurality of small holes formed as net holes, a plurality of straight parallel ribs extending downward in lengthwise and lateral direction, two large notches at both ends of a side, and four receptacles respectively having two opposite projections on an inner peripheral surface spaced apart; four feet fitting into the receptacles of the plate member to support the plate member above the ground, and respectively having two opposite L-shaped slots in an upper peripheral edge for the projections of the receptacle in the plate member to engage therein; and said feet being rotated to let the projections of the receptacles in said plate member move in left halves of a horizontal portions of the L-shaped slots in said feet so that said feet are kept secured in position, and said notches in the plate member contacting a predetermined point of an inclined post of the chicken cages to secure said plate member in a horizontal position supported by said feet, and said plate member being located between chicken cages and the ground to receive chicken wastes.

2. The waste-receiving plate as claimed in claim 1, wherein said holes provided in the plate member have proper size to prevent chicken wastes from dropping therethrough on the ground.

3. The waste-receiving plate as claimed in claim 1, wherein said plate member is preferably made of plastics, but wood or other materials can also be used.

* * * * *